Patented Jan. 6, 1953

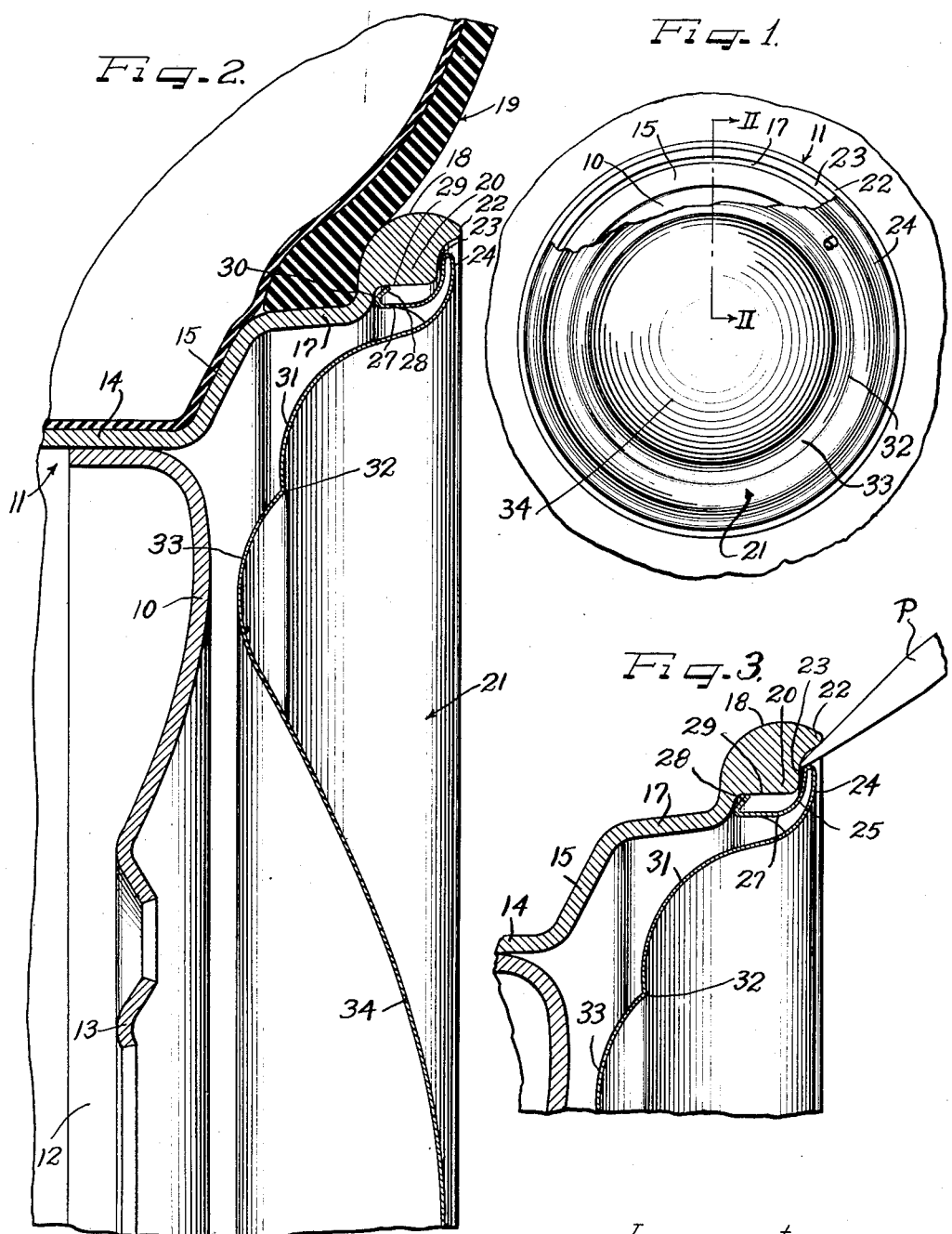

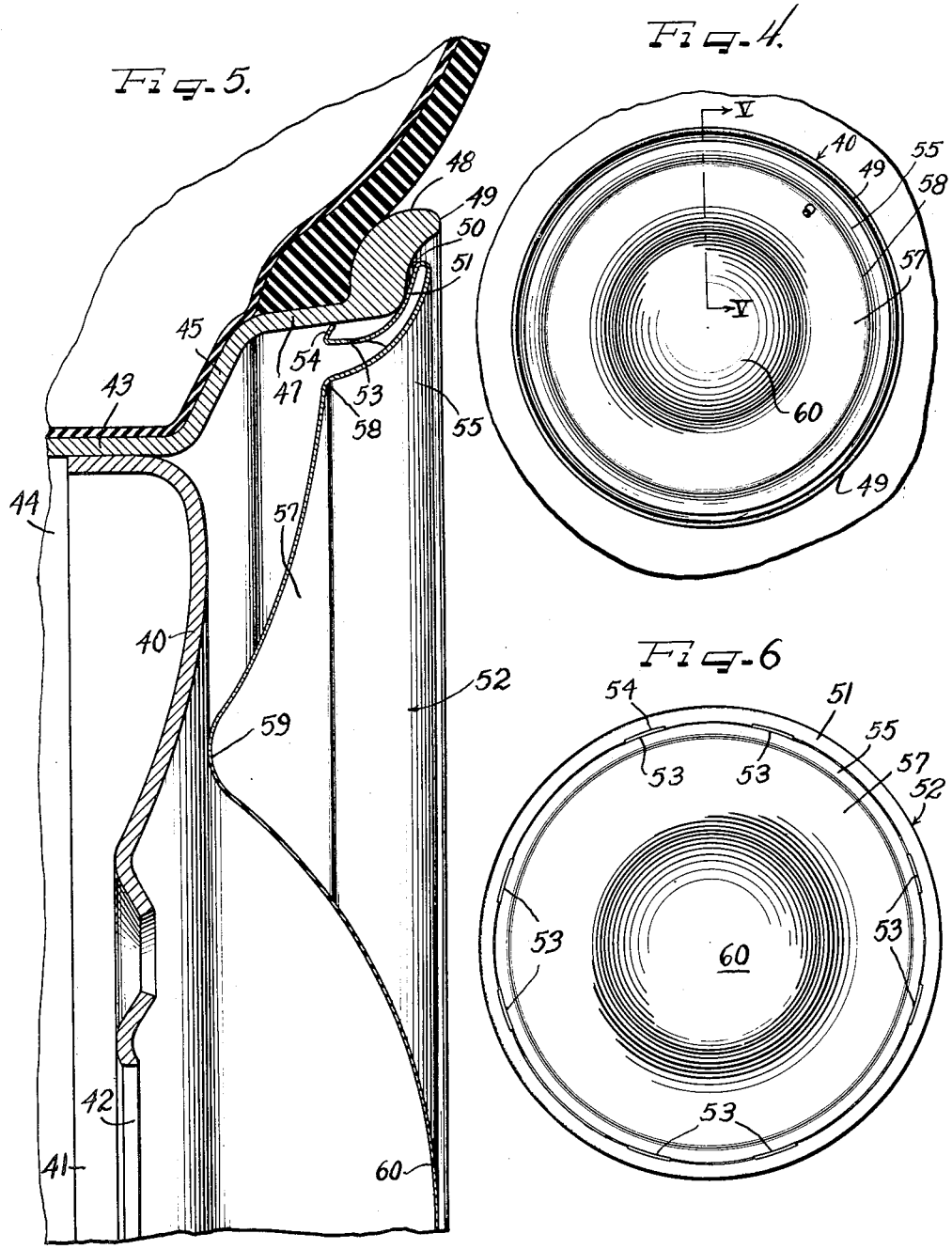

2,624,633

UNITED STATES PATENT OFFICE 2,624,633

WHEEL STRUCTURE

George Albert Lyon, Detroit, Mich.

Application February 15, 1949, Serial No. 76,480

6 Claims. (Cl. 301—37)

The present invention relates to improvements in wheel structures and more particularly concerns wheel structures of the kind adapted for use on automobiles or similar vehicles.

The recent trend in automobile wheels has been toward smaller diameters in the wheel structure and larger tires. Even with the larger size tires, however, the over all diameter of the wheel assembly including the tire is substantially smaller than the earlier forms of wheels used on automobiles. As a result, the current wheels must travel at higher speeds than the earlier larger size wheels in covering the same ground. In addition, the speeds at which automobiles are now driven are substantially higher than when the larger size wheels were current.

When larger size wheels were in use much attention was directed to reducing the weight of the wheels in order to reduce the weight of the unsprung portion of the vehicle. It is still desirable to maintain the unsprung weight of the vehicle to a minimum. However, at the higher speeds of operation now prevalent unbalancing factors in the wheels are a serious problem. Small balancing weights are customarily used on the periphery of the tire rim to overcome such unbalancing factors.

I have determined that wheel balance can be much improved by affording the outermost periphery of the metal portion of the wheel assembly with additional, generally fly-wheel or inertia mass of uniform annular distribution which does not add an undesirable additional weight to the total unsprung weight of the vehicle, but does furnish enough inertia mass at the periphery of the wheel to attain a desirable degree of damping out of both dynamic and gyroscopic minor unbalances and lends itself to ready adjustment for counteracting major unbalancing factors. The additional or inertia mass is provided in the terminal flange portions of the tire rims of the wheels.

In attaining to the desirable end of wheel balance by enlarging or filling out the terminal flanges of the tire rims, a problem has been presented in accommodating the wheel trims that are desirable for protectively and ornamentally covering the outer side of the wheel and especially the angular, fairly unattractive tire rim.

It is accordingly an important object of the present invention to provide an improved wheel structure including tire rim terminal flange concentration of inertia or balancing mass and especially constructed and adapted to accommodate wheel trim.

Another object of the invention is to provide an improved wheel structure in which the tire rim is provided with a balancing mass concentration which is effectively covered by protective and ornamental wheel trim.

A further object of the invention is to provide an improved wheel cover structure.

According to the general features of the invention there is provided in a wheel structure including a tire rim and a wheel body, the tire rim having a multi-flanged drop center cross-section formation including a terminal flange of substantially greater thickness and mass than the remainder of the flanges of the tire rim, said terminal flange having a shallow outwardly opening recess in the outer face thereof and a terminal rib defining the radially outer side of the recess while the radially inner side of the recess is open to accommodate the margin of a circular wheel trim member within the plane of the ridge of said rib.

According to other general features of the invention the terminal flange also has a shoulder at the base thereof adjacent to juncture with the remainder of the tire rim for cooperation with retaining means of the wheel trim.

According to further general features of the invention there is provided in a wheel structure invention there is provided in a wheel structure including a wheel body and a multi-flange tire rim, the terminal flange of the tire rim being substantially thickened and of greater unit mass than the remaining flanges of the tire rim, a shallow outwardly opening recess in said thickened terminal flange providing a seat for a trim member offset inwardly from the terminal edge of the flange, a cover member having a marginal portion thereof within said recess and including means located inwardly from the edge portion within said recess for attachment of the cover to the wheel.

Another feature of the invention resides in a full disk wheel cover including a convex crown portion, an outer peripheral trim ring portion of convex cross-section and an intermediate inwardly offset connecting portion comprising a juncture rib from which the remaining portions diverge on large radius curvature.

Other objects, features and advantages of the present invention will be readily apparent from the following detailed description of certain preferred embodiments thereof taken in conjunction with the accompanying drawings, in which:

Figure 1 is a side elevational view of a wheel structure embodying the features of the invention and with certain parts broken away for purposes of illustration;

Figure 2 is an enlarged fragmentary radial sectional view taken substantially on the line II—II of Figure 1;

Figure 3 is a fragmentary radial sectional view similar to Figure 2;

Figure 4 is a side elevational view of a slightly modified wheel structure embodying features of the invention;

Figure 5 is an enlarged fragmentary radial sectional view taken substantially on the line V—V of Figure 4; and Figure 6 is a rear elevational view of the cover of Figures 4 and 5.

As shown on the drawings:

A wheel structure embodying the features of the present invention includes a wheel body 10 and a tire rim 11. The wheel body 10 is preferably formed as a sheet metal stamping from appropriate gauge stock to provide a body disk having a peripheral and generally axially extending flange 12 and a central bolt-on flange 13. The peripheral flange 12 of the wheel body is secured to a base flange 14 of the tire rim in an appropriate manner as by welding or riveting. The tire rim 11 is preferably formed as a rolled section into multi-flange, drop center cross-sectional formation including in addition to the base flange 14, side flanges 15, intermediate flanges 17 and terminal flanges 18. The cross-sectional formation is such as to accommodate a pneumatic tire and tube assembly 19.

In order to attain the desired peripheral inertia mass distribution in the tire rim the base flange 14, the side flanges 15 and the intermediate flanges 17 are formed as thin as practicable, as for example, substantially the same gauge as the wheel body 10, while the terminal flange 18 is quite substantially increased in thickness and unit mass, preferably at both sides of the wheel, but at least at the outer side. Hence, in the rotation of the wheel at high speed the additional mass of the terminal flange being disposed at the extreme periphery of the metallic portion of the wheel exerts a centrifugal generally flywheel-like dynamic and gyroscopic balancing effect.

Since the inner surface of the terminal flange 18 must conform to the standard shape for drop center rims, the additional mass must be accommodated in the outer side portion of the terminal flange as indicated at 20 in Figure 2. This complicates the problem of applying a protective and ornamental wheel trim to the outer side of the tire rim.

According to the present invention, the terminal flange 18 is constructed to accommodate a wheel cover 21 efficiently and to this end has a terminal extremity lip or rib 22 projecting axially outwardly as a rim about an axially outwardly opening recess defining an axially outwardly facing shoulder 23. Within the recess thus provided is accommodated a marginal formation 24 on the cover. Herein such marginal formation of the cover comprises a convexly cross-sectioned portion of the cover having an underturned reinforcing and cover retaining flange 25 which provides a reinforcing fold about the periphery of the cover of less thickness than the depth of the recess in the outer side of the terminal flange so that the periphery of the cover lies within the plane defined by the peak of the rib 22. Hence, the margin of the cover is fully protected against curbing damage by the rib 22 and since the terminal flange is greatly strengthened by the additional counter-balancing mass 20 thereof the tire rim is strongly reinforced against curbing damage.

Retention of the cover on the wheel is effected by the provision of a series of cover retaining spring fingers 27 formed as generally axially inward extensions of the flange 25 and having generally radially and axially outwardly divergent retaining terminal flanges 28 engaging in wedging retaining relation against a generally radially inwardly facing shoulder 29 on the counter-balancing inertia mass 20. As limit upon axially inward disposition of the cover and to maintain the flange 25 in spaced relation to the shoulder 23, the retaining shoulder 29 is offset relative to juncture with the intermediate flange 17 whereby to provide a generally axially outwardly facing shoulder 30 at the base of the terminal flange 18 and adjacent juncture with the intermediate flange 17, against which the heels at juncture of the retaining flanges 28 of the retaining fingers engage when the cover is in fully assembled relation on the wheel. Through this arrangement the cover is supported in self-centering substantially floating relation with the only engagement between the cover and the wheel being effected between the shoulders 29 and 30 and the retaining flanges 28.

In applying the cover to the wheel it is generally centered with respect to the wheel and is then pushed manually inwardly to effect retaining engagement between the retaining flanges 28 and the shoulder 29. In order to remove the cover a pry-off tool P, such as a screwdriver, is inserted between the marginal formation 24 of the cover which overlies the recessed shoulder 23 and such shoulder and the tool is fulcrumed against the lip rib 22, substantially as shown in Figure 3. This is facilitated by having the diameter of the periphery of the cover somewhat smaller than the inside diameter of the rib 22. In manipulation of the pry-off tool it effects resilient radial deflection of the cover which is facilitated by the generally floating attachment of the cover and thus releases the grip of the adjacent retaining finger 27 and by applying the tool successively to spaced peripheral portions of the cover, the cover is gradually pried free from the wheel.

Although the cover 21 may be of the type which covers primarily the outer side of the angular tire rim, it is shown in Figures 1 and 2 as of the full disk-type wherein the marginal portion 24 is of generally ogee cross-sectional shape having the radially outer portion of convex cross-section while radially inwardly therefrom and axially inwardly the shape is of generally concave cross-section as indicated at 31 to juncture with an intermediate relatively sharp annular axially outwardly projecting reinforcing rib 32 from which diverges a concavely cross-section marginal portion 33 of a convexly-shaped central large radius crown portion 34. Through this arrangement the cover is adapted to be made from fairly thin sheet metal stock and is nevertheless of substantial rigidity so as to withstand the normal stresses and strain and manipulations to which it is subjected in service. The concave portions 31 and 33 afford ribs of substantial radius cooperating with the relatively sharp intermediate rib 32 in substantially enhancing the rigidity of the cover.

In the modification of Figures 4, 5 and 6, substantially the same wheel structure is involved with slight differences in the inertia mass terminal flange construction and in the wheel cover A wheel body 40 of stamped sheet metal includes a peripheral attachment flange 41 and a central bolt-on flange 42. The peripheral flange 41 is suitably attached to a base flange 43 of a tire rim 44 and which merges with a side flange 45. Extending from the side flange is an intermediate flange 47 merging with a terminal flange 48. The base, side and intermediate flanges of the tire rim are preferably of substantially the same gauge as the gauge of the stock for the wheel body 40 while the terminal flange is substantially thicker and of substantially greater unit mass in order to provide the balancing inertia mass for the wheel. A terminal lip ridge 49 on the inertia mass terminal flange 48 defines the radially outer side of an inset recess providing an inset axially outwardly facing shoulder 50 against which an underturned marginal reinforcing and retaining flange 51 of a cover 52 is engageable when the cover is assembled with the wheel. Generally axially inwardly extending retaining finger extensions 53 of the flange 51 have respective generally radially and axially outwardly extending terminal retaining finger flanges 54 that engage against the inner face of the intermediate flange 47 of the tire rim adjacent to the base of the terminal flange 48.

A marginal portion 55 of the cover 52, which joins the retaining flange 51, is preferably of convex cross-section and is received within the recess in the thickened terminal flange 48 within the plane defined by the peak of the ridge 49 so as to be fully protected against curbing or like damage in service. From the peripheral extremity, the cover portion 55 extends radially and axially inwardly to juncture with an intermediate convexly cross-sectioned portion 57 of the cover, the juncture being effected on a generally axially inwardly extending relatively sharp reinforcing rib 58, the portions 55 and 57 providing relatively large radius reinforcing ribs cooperating with the sharp rib 58 and rigidifying the cover. The intermediate portion 57 merges on a concave annular juncture rib 59 with a central convexly shaped crown portion 60.

As best seen in Figure 6, the cover 52 is provided with adjacent pairs of the retaining finger extensions 53 which are disposed by equidistance groups about the periphery of the cover. If desired, of course, the fingers 53 may be individual, equidistantly disposed units. Similar disposition of the retaining fingers 27 of the cover 21 may be had.

The cover 52 is applied to the wheel by generally centering it at the outer side of the wheel and manually forcing the cover axially inwardly to spring the retaining fingers 53 into retaining engagement with the intermediate flange 47 of the tire rim by camming the fingers inwardly past the base of the thickened inertia mass terminal flange 48. Removal of the cover is effected similarly as described in connection with the cover 21, by introducing a pry-off tool between the margin of the cover and the shoulder 50, using the lip ridge 49 as a fulcrum for the tool, the peripheral extremity of the cover being of smaller diameter than the inner diameter of the ridge 49 to afford adequate clearance.

In both forms of the wheel structure, the cover protectively covers over the angular tire rim and thus prevents accumulation of unbalancing deposits of road dirt, slush, mud or the like which might tend to have unbalancing effect on the wheel, the outer surface of the cover being smoothly finished and without any deep grooves or crevices that would tend to retain any substantial accumulation of dirt. Moreover, the covers are more easily cleaned. In addition, of course, the covers provide attractive outer covering for the wheel and especially the tire rim portions of the wheel.

I claim as my invention:

1. A wheel structure including a wheel body of stamped sheet metal and a tire rim formed as a rolled section having base, side and intermediate flanges of substantially uniform cross-section substantially approximating the gauge of the sheet metal of the wheel body and a substantially thickened outer terminal flange in one piece therewith and having greatly increased unit mass to afford balancing inertia mass at the periphery of the wheel, said terminal flange having an axially outwardly protruding terminal rib and an inset radially inner axially outwardly facing shoulder receptive of the margin of a wheel cover as well as a continuous annular shoulder at the base thereof adjacent to and extending to a substantial extent axially outwardly from juncture with the remainder of the tire rim for cooperation with retaining means on the wheel cover.

2. In combination in a wheel construction, a wheel including a supporting body and a multi-flange tire rim including a terminal flange, and a wheel cover having a marginal retaining flange structure comprising an underturned marginal portion extending generally radially inwardly and axially inwardly and having finger extensions resting against the base of the terminal flange and including generally radially outwardly extending gripping flange portions, said tire rim terminal flange having an inertia mass including a shoulder retainingly engaged by said retaining finger extremity portions.

3. In a wheel structure including a wheel body and a multi-flange tire rim, with the wheel body disposed throughout its area adjacent to the median plane of the wheel, the tire rim having a terminal flange and an intermediate flange at the outer side thereof disposed generally angularly in drop center style, said terminal flange having an annular inertia mass thickness within the angle between the terminal and intermediate flanges and with a shallow axially outwardly opening recess in said thickness defined at the radially outer side by an axially outwardly projecting annular terminal rib, said thickness also having an annular radially inwardly facing shoulder, a cover member comprising a full covering disk structure covering both the wheel body and the outer side of the tire rim, said cover member having a central crown portion and an outer marginal portion with an intermediate dished annular portion, the crown portion being disposed within the plane of said outer marginal portion, and said outer marginal portion extending generally radially outwardly and having an underturned flange providing together with the overlying marginal portion a thickness less than the depth of said recess and lying in said recess so that the annular terminal flange rib projects protectively axially outwardly therebeyond, said flange having generally radially and axially inwardly extending resilient retaining fingers extending around said terminal flange thickness and each having a generally radially and axially outwardly extending short terminal retaining flange engaging in endwise gripping relation against the radially inwardly facing shoulder on said thickness.

4. In a wheel structure including a wheel body and a tire rim of the drop center type including intermediate and terminal flanges generally angularly related and with the radially outwardly facing portions of the flanges radially offset, the angle between the radially outer portion of the terminal flange and juncture of the terminal flange with the intermediate flange being occupied by an annular inertia weight thickened portion having the axially outer side inset and providing a shallow groove radially inwardly from the terminal flange tip so that said tip provides an annular reinforcing rib about said recess, an annular generally radially inwardly facing and axially extending shoulder at the radially inner side of said thickened portion and of substantially greater width than said axially outer side of said portion, a wheel cover disposed in substantially covering relation to the tire rim and having a radially outer margin turned under and seated in said recess, the edge of said margin being spaced radially inwardly from said rib to provide a pry-off tool clearance between the edge and terminal rib, and means projecting inwardly from said turned under marginal portion and engaging said radially inwardly facing and axially extending shoulder to retain the cover on the wheel.

5. In a wheel structure including a body portion and a tire rim supported by the body portion, the tire rim having a drop center multi-flange formation in cross-section including an intermediate and a terminal flange at the outer side, the outer side of the terminal flange being filled in throughout the circumference of the tire rim and providing an annular inertia mass on the terminal flange, said inertia mass being defined at the axially outer side by a shallow recess surrounded by the tip of the terminal flange serving as an axially outwardly projecting protective rib and the axially inner side of the inertia mass being offset radially outwardly from juncture of the terminal and intermediate flanges whereby to provide radially inwardly facing and axially outwardly facing shoulders for engagement by gripping retaining fingers of a wheel cover bearing against said shoulders, said recess being adapted to receive the margin of the cover in concealing relation to the inertia mass, said radially inwardly facing shoulder being wider than said axially outwardly facing shoulder.

6. In a wheel structure including a body portion and a tire rim supported by the body portion, the tire rim having a drop center multi-flange formation in cross-section including an intermediate and a terminal flange at the outer side, the outer side of the terminal flange being filled in throughout the circumference of the tire rim and providing an annular inertia mass on the terminal flange, said inertia mass being defined at the axially outer side by a shallow recess surrounded by the tip of the terminal flange serving as an axially outwardly projecting protective rib and the axially inner side of the inertia mass being offset radially outwardly from juncture of the terminal and intermediate flanges whereby to provide radially inwardly facing and axially outwardly facing shoulders, said radially inwardly facing shoulder being wider than said axially outwardly facing shoulder, and a wheel cover for the outer side of the wheel having a marginal portion within the shallow recess and having retaining means extending therebehind about said inertia mass and including terminal retaining portions seating against said axially outwardly facing shoulder and retainingly engaging said axially inwardly facing shoulder.

GEORGE ALBERT LYON.

REFERENCES CITED

The following references are of record in the file of this patent:

UNITED STATES PATENTS

| Number | Name | Date |
| --- | --- | --- |
| Re. 19,467 | Lyon | Feb. 12, 1935 |
| 1,788,431 | Goodyear | Jan. 13, 1931 |
| 2,029,132 | Skelton | Jan. 28, 1936 |
| 2,089,952 | Fergueson | Aug. 17, 1937 |
| 2,148,160 | Hollerith | Feb. 21, 1939 |
| 2,226,511 | Hollerith | Dec. 24, 1940 |